United States Patent
Ogura et al.

(10) Patent No.: US 11,626,939 B2
(45) Date of Patent: Apr. 11, 2023

(54) WIRELESS APPARATUS AND COMMUNICATION METHOD

(71) Applicant: KABUSHIKI KAISHA TOSHIBA, Tokyo (JP)

(72) Inventors: Miyuki Ogura, Tokyo (JP); Toshihisa Nabetani, Kanagawa (JP); Tomoya Tandai, Tokyo (JP); Tatsuma Hirano, Kanagawa (JP); Tsuyoshi Kogawa, Kanagawa (JP); Haruka Obata, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 114 days.

(21) Appl. No.: 17/198,146

(22) Filed: Mar. 10, 2021

(65) Prior Publication Data

US 2022/0038205 A1 Feb. 3, 2022

(30) Foreign Application Priority Data

Jul. 31, 2020 (JP) .............................. JP2020-130311

(51) Int. Cl.
| | |
|---|---|
| *H04L 1/00* | (2006.01) |
| *H04W 24/08* | (2009.01) |
| *H04W 68/00* | (2009.01) |
| *H04W 84/00* | (2009.01) |
| *H04W 36/00* | (2009.01) |
| *H04W 36/32* | (2009.01) |
| *H04W 84/12* | (2009.01) |
| *H04W 88/04* | (2009.01) |

(52) U.S. Cl.
CPC .......... *H04L 1/0025* (2013.01); *H04L 1/0001* (2013.01); *H04W 24/08* (2013.01); *H04W 36/03* (2018.08); *H04W 68/005* (2013.01); *H04L 2001/0097* (2013.01); *H04W 36/32* (2013.01); *H04W 84/005* (2013.01); *H04W 84/12* (2013.01); *H04W 88/04* (2013.01)

(58) Field of Classification Search
None
See application file for complete search history.

(56) References Cited

U.S. PATENT DOCUMENTS

| | | | |
|---|---|---|---|
| 2016/0119844 A1 | 4/2016 | Uchino et al. | |
| 2017/0034842 A1* | 2/2017 | Xu | H04W 8/005 |
| 2019/0134818 A1* | 5/2019 | Mangaser | G16H 40/63 |
| 2019/0166630 A1* | 5/2019 | Sivakumar | H04W 8/005 |
| 2019/0320495 A1* | 10/2019 | Kuang | H04W 88/04 |
| 2021/0176820 A1* | 6/2021 | Zhang | H04W 8/005 |

FOREIGN PATENT DOCUMENTS

| | | |
|---|---|---|
| JP | 2014236354 A | 12/2014 |
| JP | 2019134217 A | 8/2019 |

* cited by examiner

*Primary Examiner* — Jay L Vogel
(74) *Attorney, Agent, or Firm* — Holtz, Holtz & Volek PC

(57) ABSTRACT

According to one embodiment, a wireless apparatus determines a state of a first wireless link with a first mobile station and a state of a second wireless link with a second mobile station in a first communication mode, and transmits a first signal to the first and the second mobile stations in accordance with the states of the first and the second wireless links. In response to the first signal, the first communication mode is changed to a second communication mode in which the wireless apparatus communicates with the second mobile station via a direct communication between the first and the second mobile stations.

24 Claims, 9 Drawing Sheets

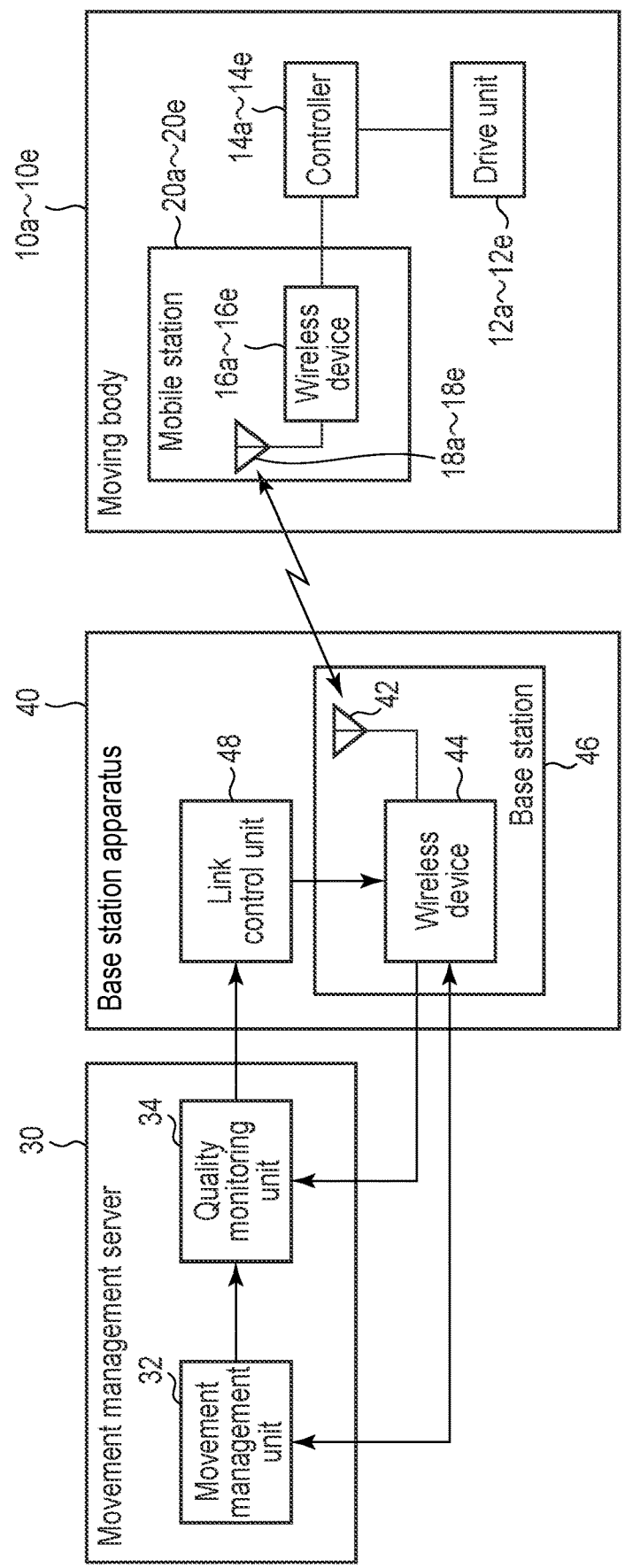
F I G. 2

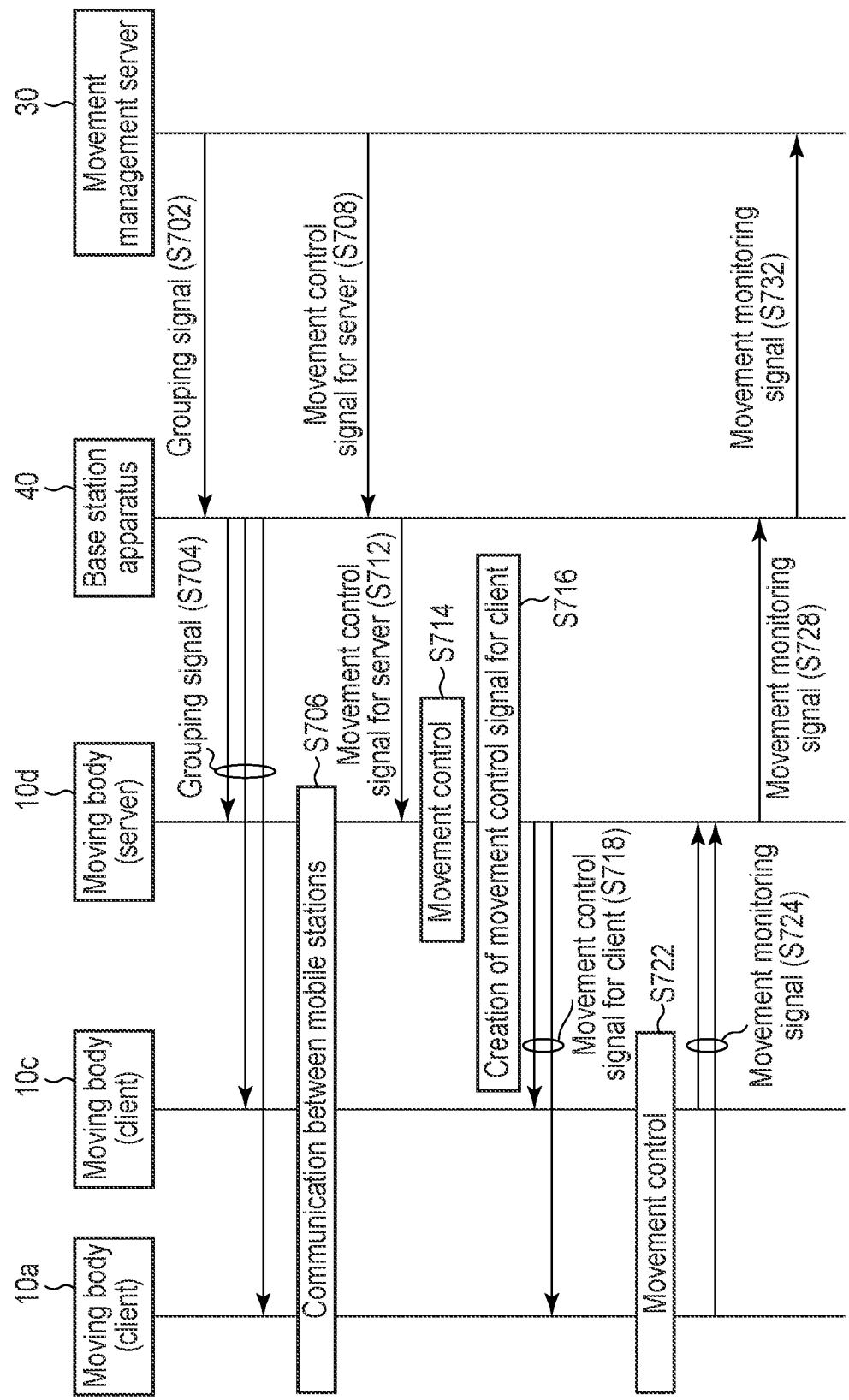
F I G. 6

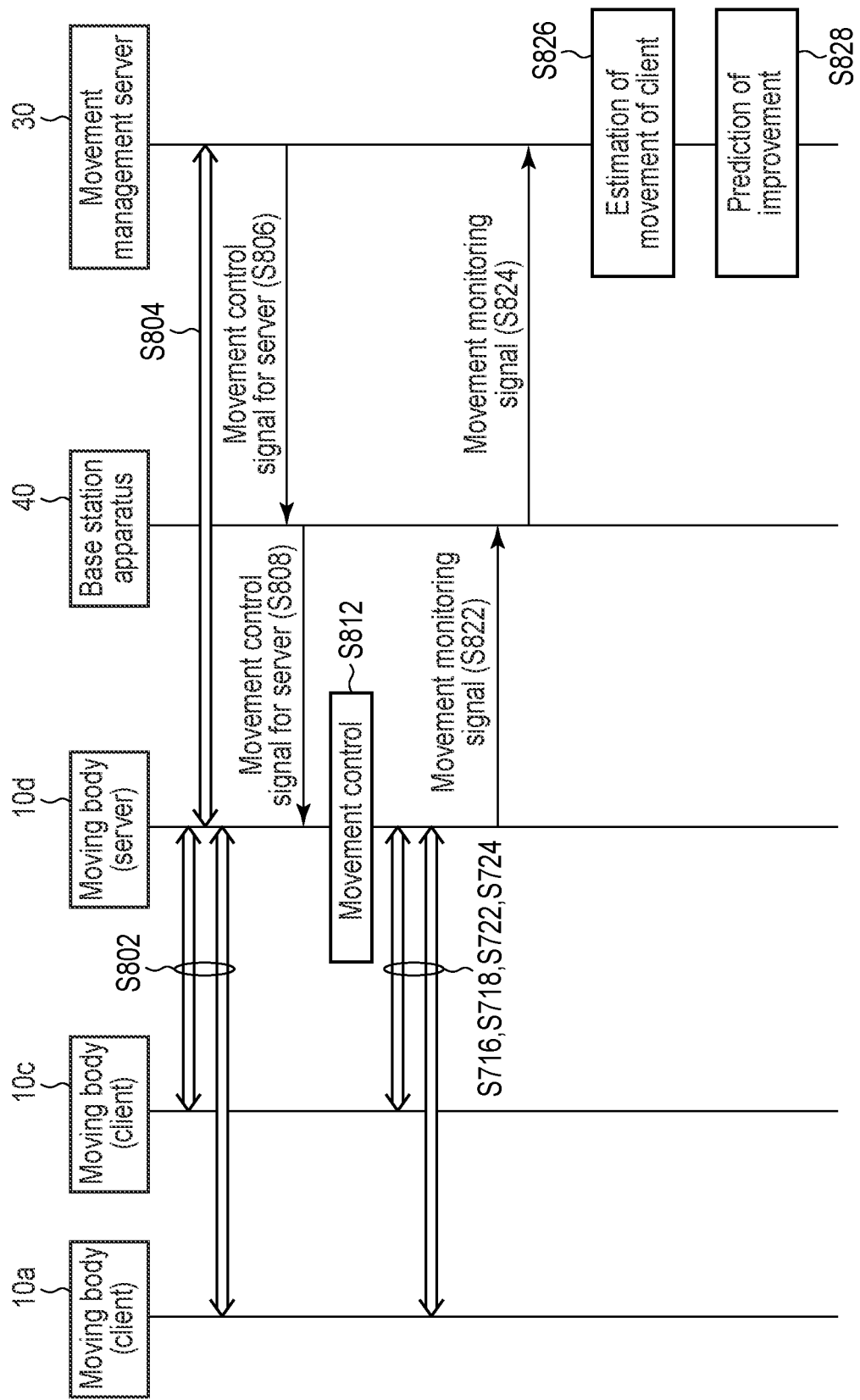
F I G. 7

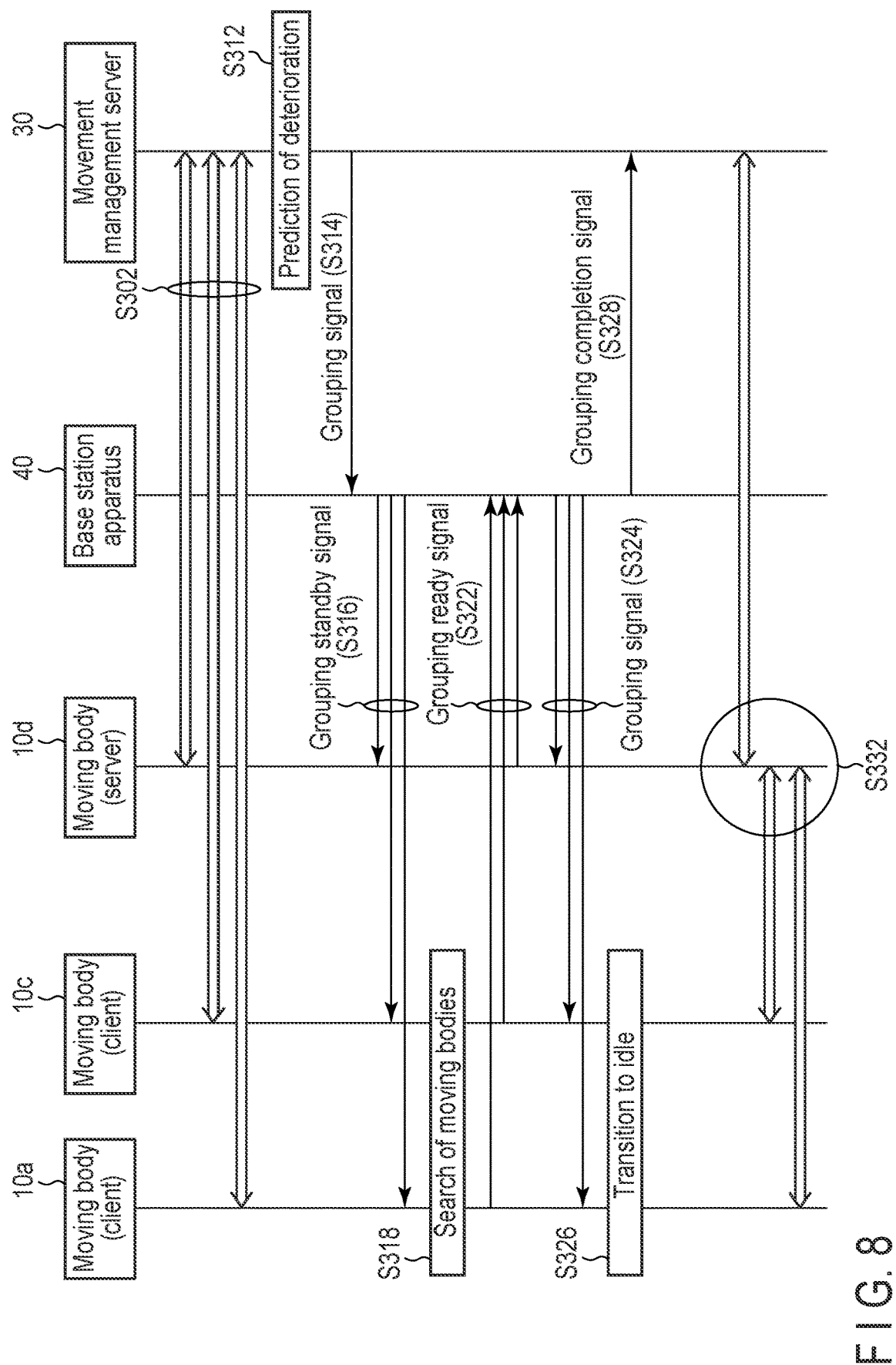
F I G. 8

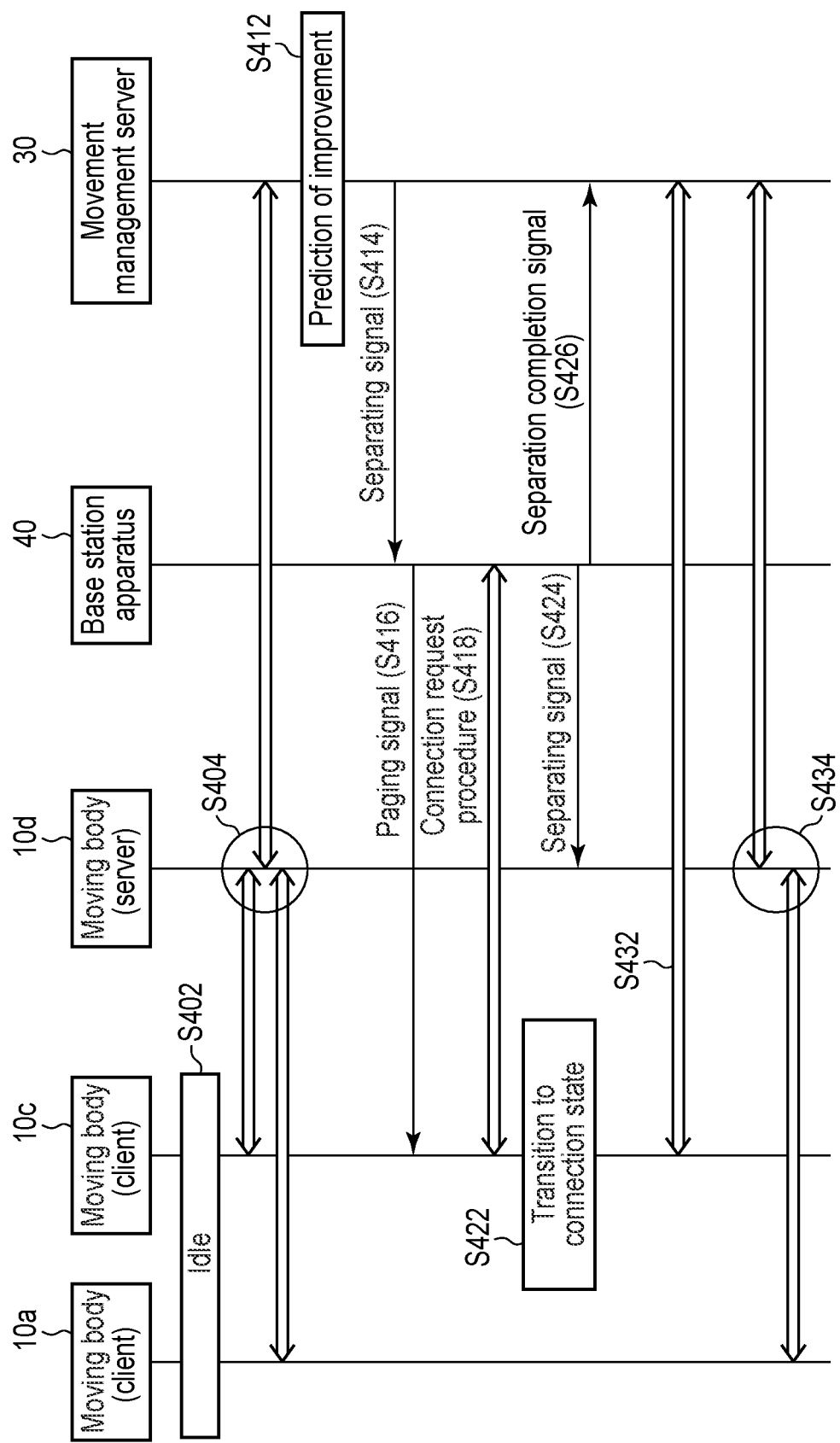
F I G. 9

WIRELESS APPARATUS AND COMMUNICATION METHOD

CROSS-REFERENCE TO RELATED APPLICATIONS

This application is based upon and claims the benefit of priority from Japanese Patent Application No. 2020-130311, filed Jul. 31, 2020, the entire contents of which are incorporated herein by reference.

FIELD

Embodiments described herein relate generally to a wireless apparatus and a communication method.

BACKGROUND

Application examples of a wireless apparatus include a system including a base station and a mobile station. In this system, the base station transmits a signal to the mobile station via a wireless link. When a connection quality of the wireless link between the mobile station and the base station is deteriorated, a reception quality of the signal is deteriorated in the mobile station.

BRIEF DESCRIPTION OF THE DRAWINGS

FIG. 2 is a diagram showing an example of a configuration of a movement management server, a base station, and a moving body in the movement management system.

FIG. 6 is a sequence chart showing an example of a communication procedure for an intra-group communication.

FIG. 7 is a sequence chart showing an example of the communication procedure for the intra-group communication.

FIG. 8 is a sequence chart showing an example of a communication procedure at the time of link switching by the base station.

FIG. 9 is a sequence chart showing another example of a communication procedure at the time of link switching by the base station.

DETAILED DESCRIPTION

Figure 1:
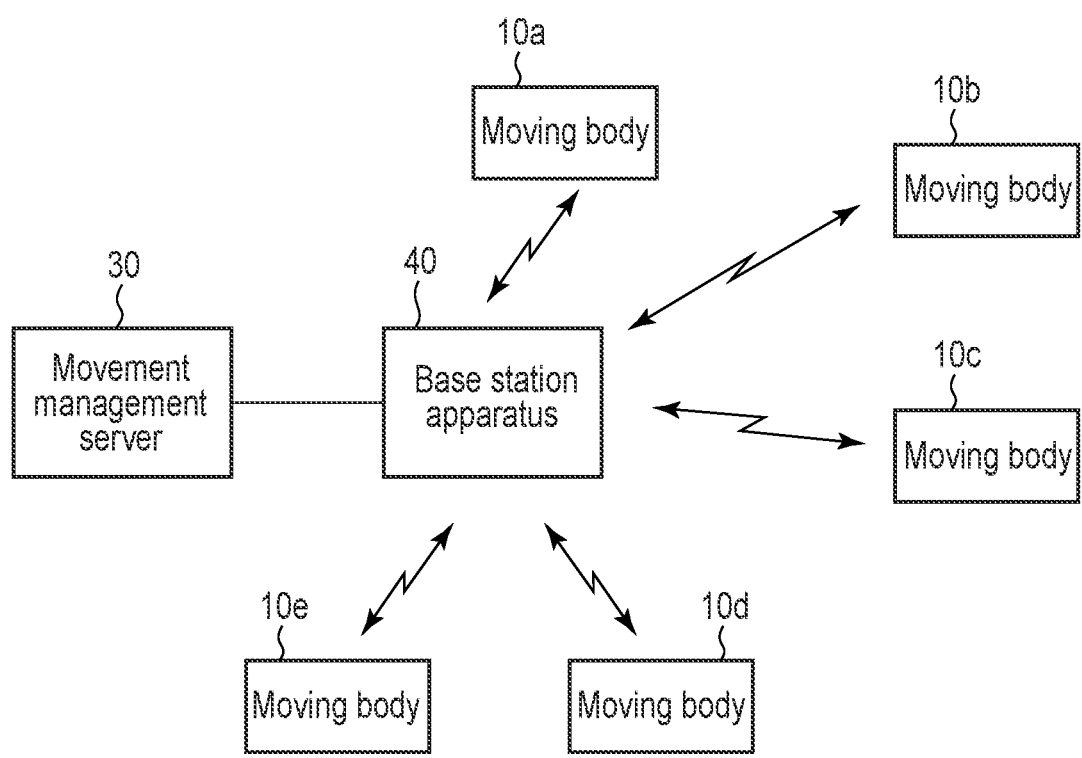
FIG. 1 is a diagram showing an example of a configuration of a movement management system according to a first embodiment.

Various embodiments will be described hereinafter with reference to the accompanying drawings.

The disclosure is merely an example and is not limited by contents described in the embodiments described below. Modification which is easily conceivable by a person of ordinary skill in the art comes within the scope of the disclosure as a matter of course. In order to make the description clearer, the sizes, shapes, and the like of the respective parts may be changed and illustrated schematically in the drawings as compared with those in an accurate representation. Constituent elements corresponding to each other in a plurality of drawings are denoted by like reference numerals and their detailed descriptions may be omitted unless necessary.

In general, according to one embodiment, a wireless apparatus includes wireless circuitry and a controller. The wireless circuitry is capable of communicating with a first mobile station and a second mobile station in a first communication mode or a second communication mode. The wireless circuitry communicates with the first mobile station and the second mobile station without a direct communication between the first mobile station and the second mobile station in the first communication mode. The wireless circuitry communicates with at least one of the first mobile station or the second mobile station via the direct communication between the first mobile station and the second mobile station in the second communication mode. The controller is configured to determine a state of a first wireless link between the first mobile station and the wireless circuitry and a state of a second wireless link between the second mobile station and the wireless circuitry in the first communication mode, and transmit a first signal to the first mobile station and the second mobile station by the wireless circuitry in accordance with the state of the first wireless link and the state of the second wireless link. The first signal includes a signal for changing the first communication mode to the second communication mode.

Movement Management System

A movement management system that is an application example of the wireless apparatus according to the embodiment will be described. A movement management system generally includes a base station and a movement management server. The base station performs a communication service with a moving body by transmitting a wireless signal and receiving a wireless signal in accordance with a predetermined communication method. The movement management server is connected to the base station. Information is transmitted and received between the moving body and the base station as a payload of a wireless frame via wireless communication between the moving body and the base station. The transmitted and received information includes control information transmitted from the movement management server to the moving body and monitoring information transmitted from the moving body to the movement management server.

FIG. 1 shows an example of the configuration of the movement management system. FIG. 2 shows an example of the configuration of a moving body 10, a base station apparatus 40, and a movement management server 30.

The movement management system includes the movement management server 30 and the base station apparatus 40. The moving management 30 manages movement of a plurality of moving bodies 10a, 10b, 10c, 10d, and 10e (hereinafter, they are sometimes collectively referred to as the moving body 10 when it is not necessary to distinguish the plurality of moving bodies individually). The number of the moving bodies 10 may be singular. If plural, the number is not limited to 5.

The moving body 10 includes all that moves in response to a control signal. Examples of the moving body 10 include an automated guided vehicle (AGV), a robot, a drone, an unmanned helicopter, an unmanned aerial vehicle, and an unmanned ship. Movement includes ail modes of movement.

The moving bodies 10a, 10b, 10c, 10d, and 10e include drive units 12a, 12b, 12c, 12d, and 12e (sometimes collectively referred to as the drive unit 12), respectively. Examples of the drive unit 12 include a vehicle, a propeller, a screw, a caterpillar, a steering unit, a motor, and an engine. Controllers 14a, 14b, 14c, 14d, and 14e (sometimes collectively referred to as the controller 14) are connected to the drive units 12a, 12b, 12c, 12d, and 12e, respectively. Mobile stations 20a, 20b, 20c, 20d, and 20e (sometimes collectively referred to as the mobile station 20) are connected to the controllers 14a, 14b, 14c, 14d, and 14e, respectively. The mobile stations 20a, 20b, 20c, 20d, and 20e include wireless devices 16a, 16b, 16c, 16d, and 16e (sometimes collectively referred to as the wireless device 16) and antennas 18a, 18b, 18c, 18d, and 18e (sometimes collectively referred to as the antenna 18), respectively.

The controller 14 functions as a client of the movement management server 30. The movement management server 30 executes an application program (hereinafter simply referred to as the application) that manages the movement of the moving body 10 and instructs the controller 14 to execute processing necessary for execution of the application. Note that the processing necessary for execution of the application is also executed by the base station apparatus 40.

The controller 14 transmits a processing request signal giving an instruction on execution of processing necessary for execution of the application to the drive unit 12 and transmits a processing response signal indicating the execution result of the processing by the drive unit 12 to the movement management server 30.

The controller 14 may be implemented by a hardware or may be implemented by a software executed by the processor.

The controller 14 connects the wireless link between the moving body 10 and the base station apparatus 40 in accordance with a predetermined procedure. The moving body 10 located in a communication range of the base station apparatus 40 can receive a wireless communication service via the wireless link between the moving body 10 and the base station apparatus 40. The movement management server 30 is connected to the base station apparatus 40 by wire or wirelessly and executes an application related to the movement management of the moving body 10.

The movement management server 30 may be implemented by a hardware by a physical server separate from the base station apparatus 40, or may be implemented by a software as an application embedded in the processor of the base station apparatus 40.

The processing request signal and the processing response signal related to the execution of the application of the movement management server 30 are included in the payload of a wireless frame transmitted between the base station apparatus 40 and the moving body 10 exchanged between the base station apparatus 40 and the moving body 10.

The movement management server 30 transmits a control signal including, for example, a target position, a moving speed, and a moving direction as a processing request signal to the moving body 10. The moving body 10 controls its own movement based on the target position, the moving speed, and the moving direction included in the control signal from the movement management server 30. The moving body 10 may transmit a monitoring signal including a current position, an actual moving speed, and a moving locus as a processing response signal to the movement management server 30. The movement management server 30 may generate a next control signal of the moving body 10 based on the received monitoring signal.

Thus, each moving body 10 controls its own movement based on the control information sent from the movement management server 30 via the base station apparatus 40.

In such a movement management system, if the connection quality of the wireless link between the base station apparatus 40 and the moving body 10 is deteriorated, the moving body 10 is not capable of receiving the control signal and the movement of the moving body 10 becomes unstable, thereby causing a concern that the movement control quality is deteriorated.

In order to solve this, the movement management server 30 monitors the connection quality of the wireless link between the base station apparatus 40 and the moving body 10. The connection quality of the wireless link can be monitored by measuring the reception power and the error rate of the wireless signal transmitted from the moving body 10, or by measuring the round trip time (RTT) by transmission and reception of an alive monitoring packet. When detecting that the connection quality of the wireless link between the base station apparatus 40 and a certain moving body 10 has been deteriorated and that the movement control quality of the certain moving body 10 has been deteriorated, the movement management server 30 switches the wireless link of the certain moving body 10.

Furthermore, the movement management server 30 also has a function of predicting deterioration because there is a possibility that deterioration of the movement control quality occurs during the link switching period if the wireless link is switched after the deterioration is actually detected. When the movement management server 30 predicts that the connection quality of the wireless link between the base station apparatus 40 and the certain moving body 10 is deteriorated and the movement control quality of the certain moving body 10 is deteriorated, the movement management server 30 switches the wireless link of the certain moving body 10.

Specifically, the movement management server 30 switches the wireless link between the base station apparatus 40 and the certain moving body 10 whose movement control quality is detected to have been deteriorated or between the base station apparatus 40 and the certain moving body 10 whose movement control quality has been predicted to be deteriorated to a bypass wireless link. The bypass wireless link includes a wireless link between the base station apparatus 40 and a relay moving body and a wireless link between the relay moving body and the certain moving body 10. The relay moving body is a moving body 10 that is in a communication range of the certain moving body 10, has a good connection quality of the wireless link with the base station apparatus 40 and can or is predicted to be able to communicate with the base station apparatus 40.

Thus, the certain moving body 10 whose connection quality of the wireless link with the base station apparatus 40 has been deteriorated or has been predicted to be deteriorated can receive the control signal from the movement management server 30 via the bypass wireless link via the relay moving body 10. Therefore, even if the connection quality of the wireless link between the certain moving body 10 and the base station apparatus 40 has been deteriorated or is predicted to be deteriorated, it is prevented that the reception quality of the control signal of the certain moving body 10 is deteriorated and the movement becomes unstable, i.e., the movement control quality is prevented from being deteriorated.

As shown in FIG. 2, the base station apparatus 40 includes a base station 46 and a link control unit 48. The base station 46 includes an antenna 42 and a wireless device 44. The link control unit 43 controls connection and disconnection of the wireless link between the base station apparatus 40 and the moving body 10 or the wireless link between the moving bodies 10. The link control unit 48 controls connection and disconnection of the wireless link between the base station apparatus 40 and the moving body 10, i.e., between the base station 46 and the mobile station 20, or between the moving bodies 10, i.e., between the mobile stations 20.

The link control unit 48 may be implemented by a hardware or may be implemented by a software executed by the processor.

The movement management server 30 includes a movement management unit 32 and a quality monitoring unit 34. Each of the movement management unit 32 and the quality monitoring unit 34 may be implemented by a hardware or may be implemented by a software executed by the processor.

In a case where the link control unit 48, the movement management unit 32, and the quality monitoring unit 34 are implemented by a software, the base station apparatus 40 and the movement management server 30 may include separate processors or may include a common processor.

The base station apparatus 40 performs wireless communication with the plurality of moving bodies 10 in a predetermined frame format. Wireless signals between the base station apparatus 40 and the moving body 10 include a control signal and a monitoring signal exchanged between the moving body 10 and the movement management server 30. The wireless signals also include various link control signals necessary for controlling the wireless link of the moving body 10.

The wireless device 44 inserts the control signal generated by the movement management unit 32 into the payload of the wireless frame and transmits it to the corresponding moving body 10. The wireless device 44 receives the wireless frame transmitted from the moving body 10, extracts a monitoring signal from the payload of the wireless frame, and transmits the monitoring signal to the movement management unit 32. The wireless device 44 measures the connection quality of the wireless link by measuring the reception power and the error rate of the wireless signal transmitted from the moving body 10 or by measuring the RTT by transmission and reception of an alive monitoring packet, and transmits the measurement result to the quality monitoring unit 34.

The base station 46 generates a signal for controlling the wireless link of the moving body 10 based on an instruction from the link control unit 48.

The movement management unit 32 monitors the movement (current position, moving route, surrounding status, and the like) of the moving body 10, generates a control signal of the moving body 10 in accordance with the movement, and supplies the control signal to the wireless device 44. The movement management unit 32 can grasp the movement of the moving body 10 based on the monitoring signal of the moving body 10 supplied from the wireless device 44.

Note that in order to monitor the movement of the moving body 10, the movement management unit 32 may not necessarily use the monitoring signal from the moving body 10. For example, the movement management unit 32 may monitor the movement of the moving body 10 using image information of a monitoring camera or the like that images the moving range of the moving body 10. In this case, the moving body 10 may not transmit the monitoring signal to the base station 46. The movement management unit 32 generates a control signal in accordance with the movement of the moving body 10 and transmits the control signal to the quality monitoring unit 34.

Based on the measurement result of the connection quality of the wireless link sent from the wireless device 44, the quality monitoring unit 34 determines a first moving body whose movement control quality has been deteriorated due to deterioration of the connection quality of the wireless link with the base station apparatus 40, and also determines the deterioration time. The number of the first moving bodies may be plural. In a case where the quality monitoring unit 34 determines a plurality of first moving bodies, the quality monitoring unit 34 may determines the single deterioration time or a plurality of deterioration times.

Similarly, the quality monitoring unit 34 performs analysis processing such as machine learning. Inputs to the machine learning are the measurement result of the connection quality of the wireless link sent from the wireless device 44 and the control, signal of the moving body sent from the movement management unit 32 using the machine learning, the quality monitoring unit 34 determines the first moving body whose movement control quality has been predicted to be deteriorated in the future due to deterioration of the connection quality of the wireless link with the base station apparatus 40, and the deterioration prediction time. The number of the first moving bodies may be plural. In a case where the number of the first moving bodies 10 is plural, the deterioration prediction time may also be singular or plural.

Thus, the quality monitoring unit 34 detects or predicts deterioration of the movement control quality of the moving body 10.

Quality Deterioration Prediction

The quality deterioration prediction function of the quality monitoring unit 34 will be described.

Figure 3:
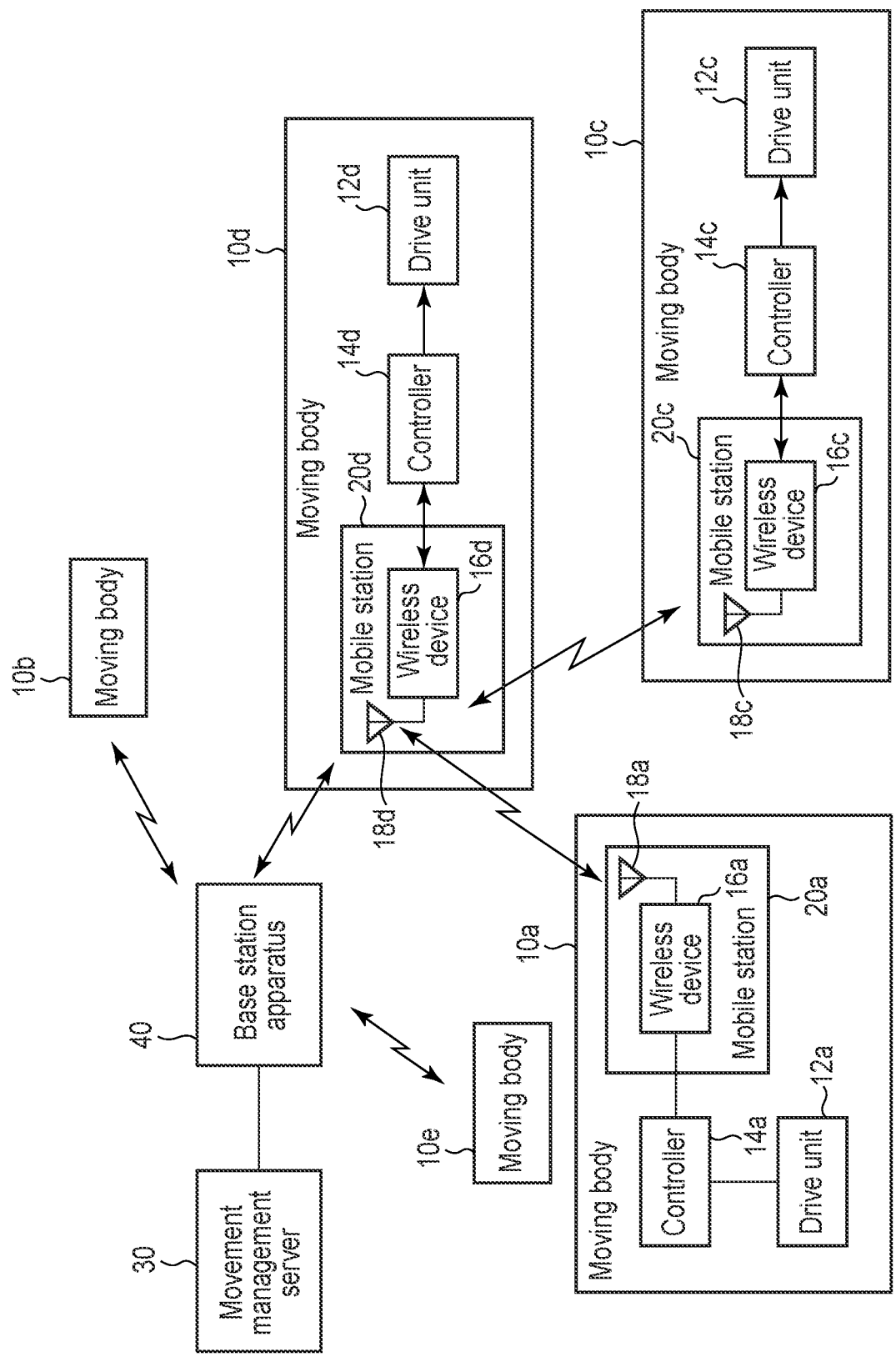
FIG. 3 is a diagram showing an example of the configuration of the movement management system at a time different from the time shown in FIG. 1.
Figure 4:
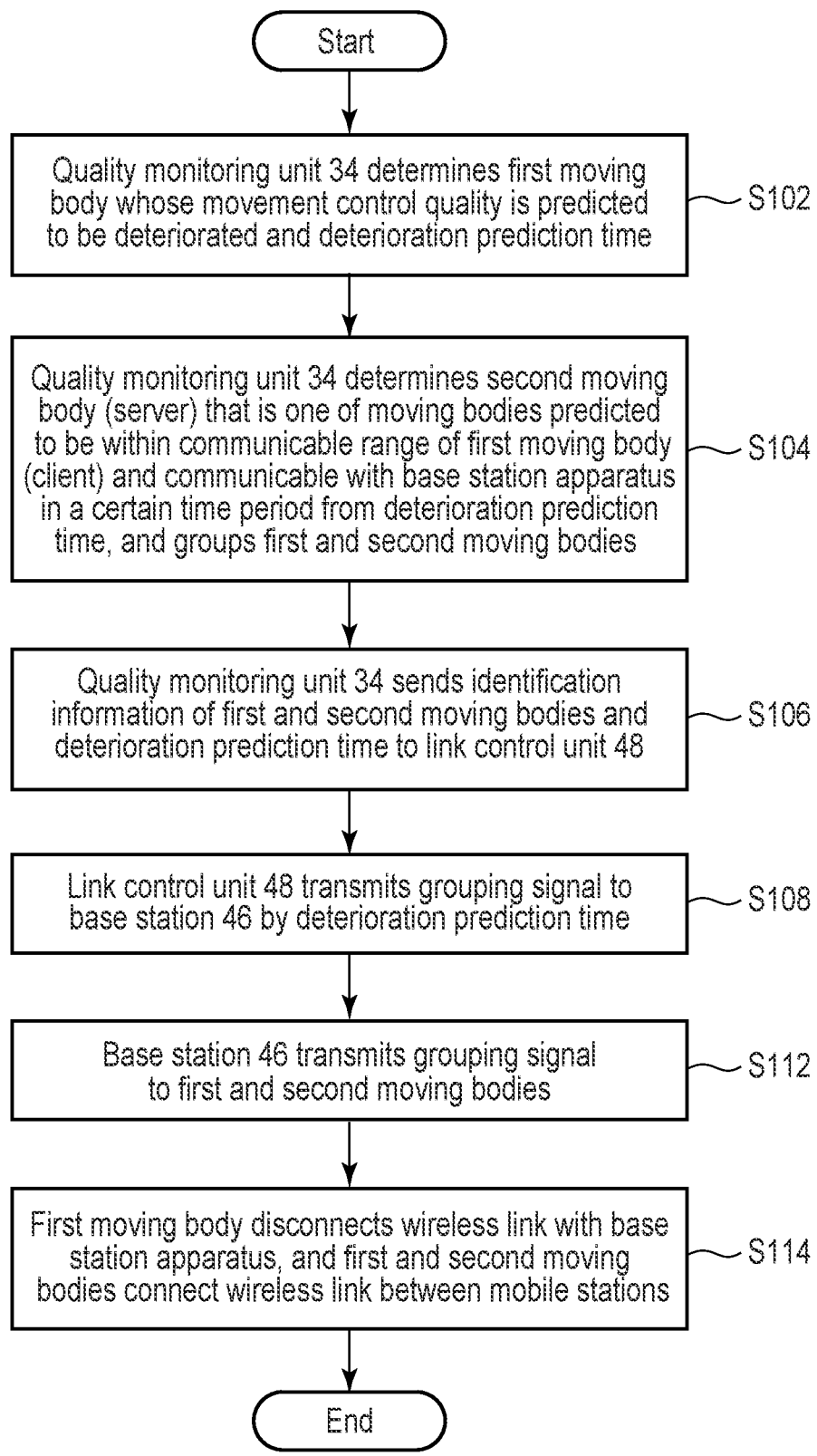
FIG. 4 is a flowchart showing an example of the operation of the movement management system.

Assuming that at present, as shown in FIG. 1, the connection quality of the wireless link between the five moving bodies 10 and the base station apparatus 40 is good. However, assume that at a certain timing in the future, as shown in FIG. 3, it is predicted that the connection quality of the wireless link between the three moving bodies 10*b*, 10*d*, and 10*e* and the base station apparatus 40 continues to be good, but the connection quality of the wireless link between the two moving bodies 10*a* and 10*c* and the base station apparatus 40 is deteriorated. FIG. 4 shows an example of the operation of the movement management system in a case where the state of the movement management system 10 changes from the state of FIG. 1 to the state of FIG. 3.

The quality monitoring unit 34 determines the first moving body (here, the moving bodies 10*a* and 10*c*) whose movement control quality is predicted to be deteriorated due to the deterioration of the connection quality of the wireless link with the base station apparatus 40, and deterioration prediction times ta1 and ta2 of the first moving bodies 10*a* and 10*c*, respectively (step S102 of FIG. 4). The times ta1 and ta2 may be the same, but they are different, here.

The quality monitoring unit 34 determines the second moving body (moving body 10*d* in FIG. 3) that is one of the moving bodies within the communication range of the first moving body 10*a* and is predicted to be able to continue to communicate with the base station apparatus 40 in a certain time period from the deterioration prediction time ta1 of the first moving body 10*a*. The reason for judging in the certain time period is to prevent the wireless link from being switched frequently. The certain time period is a time during which the second moving body 10*d* can continue communication with the first moving body (moving body 10a in FIG. 3), and varies from several 10 seconds to several minutes depending on the moving route and the surrounding status. Furthermore, the quality monitoring unit 34 groups the first and second moving bodies 10a and 10d (step S104 of FIG. 4). The second moving body 10d is set as a server for an intra-group communication and the first moving body 10a is set as a client for the intra-group communication.

Similarly, the quality monitoring unit 34 determines the second moving body (moving body 10d in FIG. 3) that is one of the moving bodies within the communication range of the first moving body 10c and is predicted to be able to continue to communicate with the base station apparatus 40 in the certain time period from the deterioration prediction time ta2 of the first moving body 10c. A same moving body can be selected as the second moving body determined for the certain time period from the time ta1 and the second moving body determined for the certain time period from the time ta2. In a case where the same moving body cannot be selected, different moving bodies are selected. Furthermore, the quality monitoring unit 34 groups the first and second moving bodies 10c and 10d (step S104 of FIG. 4). The second moving body 10d is set as the server for the intra-group communication and the first moving body 10c is set as the client for the intra-group communication.

The intra-group communication may be referred to as communication between the moving bodies 10 (specifically, mobile stations 20).

The server (second moving body 10d) for the intra-group communication including the first moving body 10c whose moving quality control is predicted to be deteriorated at the time ta2 is the same as the server (second moving body 10d) for the first moving body 10a whose moving quality control is predicted to be deteriorated at the time ta1. Therefore, the one server (moving body 10d) and the two clients (first moving bodies 10a and 10c) form one group.

Note that the concept of group is not limited to this. In a case where the movement control qualities of the two moving bodies 10a and 10c are predicted to be deteriorated at the deterioration prediction times ta1 and ta2, respectively, the moving body 10a whose movement control quality is predicted to be deteriorated first may form one group with the moving body 10d, and then the moving body 10c whose movement control quality is predicted to be deteriorated next may form another group with the moving body 10d or another moving body. Whether to be the same group or another group may be determined regardless of whether or not the servers are the same. Different moving bodies connected to different servers via wireless links form different groups. Different moving bodies connected to the same server via wireless links may form different groups or may form the same group.

The quality monitoring unit 34 transmits identification information of the first and second moving bodies 10a and 10d, the deterioration prediction time ta1, identification information of the first and second moving bodies 10c and 10d, and the deterioration prediction time ta2 to the link control unit 43 (step S106 of FIG. 4).

The link control unit 48 transmits, to the base station 46 by the deterioration prediction time ta1, a first grouping signal. The first grouping signal instructs grouping the first and second moving bodies 10a and 10d and switching the wireless link between the base station apparatus 40 and the first moving body 10a to the bypass wireless link. The bypass wireless link includes the wireless link between the base station apparatus 40 and the second moving body 10a and the wireless link between the second and first moving bodies 10d and 10a (step S108 of FIG. 4).

Similarly, the link control unit 48 transmits, to the base station 46 by the deterioration prediction time ta2, a second grouping signal. The second grouping signal instructs grouping the first and second moving bodies 10c and 10d and switching the wireless link between the base station apparatus 40 and the first moving body 10c to the bypass wireless link. The bypass wireless link includes the wireless link between the base station apparatus 40 and the second moving body 10d and the wireless link between the second and first moving bodies 10d and 10c (step S108 of FIG. 4).

The first grouping signal may include the deterioration prediction time ta1. The second grouping signal may include the deterioration prediction time ta2.

The base station 46 transmits the first grouping signals to the first and second moving bodies 10a and 10d, and transmits the second grouping signals to the first and second moving bodies 10c and 10d (step S112 of FIG. 4).

Upon receiving the first grouping signal, the controller 14a of the first moving body 10a disconnects the wireless link with the base station apparatus 40 and connects the intra-group wireless link between mobile stations 10a and 10a. In the intra-group wireless link, the second moving body 10d is the server and the first moving body 10a is the client. Upon receiving the first grouping signal, the second moving body 10d maintains the wireless link with the base station apparatus 40 and connects the intra-group wireless link between mobile stations 10d and 10a. In the intra-group wireless link, the second moving body 10a is the server and the first moving body 10a is the client. Thus, communication between the second and first moving bodies 10d and 10a is enabled (step S114 of FIG. 4).

Similarly, upon receiving the second grouping signal, the controller 14c of the first moving body 10c disconnects the wireless link with the base station apparatus 40 and connects the intra-group wireless link between mobile stations 10d and 10c. In the intra-group wireless link, the second moving body 10d is the server and the first moving body 10c is the client. Upon receiving the second grouping signal, the second moving body 10d maintains the wireless link with the base station apparatus 40 and connects the intra-group wireless link between mobile stations 10d and 10c. In the intra-group wireless link, the second moving body 10a is the server and the first moving body 10c is the client. Thus, the intra-group communication between the second and first moving bodies 10d and 10c is enabled (step S114 of FIG. 4).

The timing at which the link control unit 43 transmits the first and second grouping signals to the base station 46 in step S108 is set, in consideration of the time required for switching the link. The timing is set such that the time at which intra-group communication is enabled (step S114) is earlier than the deterioration prediction time.

Thus, before receiving the grouping signal, each moving body 10 receives the control signal from the movement management server 30 via the wireless link with the base station apparatus 40. That is, each moving body 10 independently communicates with the base station apparatus 40. This communication mode is referred to as a first communication mode. In the first, communication mode, indirect communication between the moving body 10a and the moving bodies 10a and 10c is performed by the base station apparatus 40 and the moving body 10d does not directly communicate with the moving bodies 10a and 10c.

Upon receiving the grouping signal in the first communication mode, each moving body 10 is grouped with another moving body 10 and starts the intra-group communication with the other moving body 10. The other-moving body 10 can communicate with the base station 46. The number of groups to be formed may be plural. The group includes the first moving bodies (client) 10a and 10c and the second moving body (server) 10d. The clients 10a and 10c are moving bodies whose connection quality of the wireless link with the base station apparatus 40 is predicted to be deteriorated and whose movement control quality is predicted to be deteriorated. The server 10d is a moving body that is within a communication range with the first moving bodies 10a and 10c and is predicted to be able to continue communication with the base station apparatus 40. The server 10d is also referred to as a master mobile station apparatus, and the clients 10a and 10c are also referred to as a slave mobile station apparatus. The clients 10a and 10c cannot directly communicate with the base station apparatus 40, but can indirectly communicate with the base station apparatus 40 via the server 10d. This communication mode is referred to as a second communication mode. That is, in the second communication mode, communication between the moving body 10d and the moving bodies 10a and 10c is performed by the base station apparatus 40 via at least part of direct communication between the moving body 10d and the moving bodies 10a and 10c.

The communication mode of the first moving body whose movement control quality has been predicted to be deteriorated is switched from the first communication mode to the second communication mode by the deterioration prediction time. Therefore, the first moving body receives the control signal via the second moving body after the deterioration prediction time has passed, and hence the movement control quality is prevented from being deteriorated.

The grouping signal instructs to change the communication mode of each moving body 10 from the first communication mode to the second communication mode. That is, the grouping signal instructs to switch from the first communication mode in which each moving body 10 is independently connected to the base station apparatus 40 to the second communication mode in which a plurality of moving bodies is grouped. In the second communication mode, the intra-group communication is performed and one moving body in the group is connected to the case station apparatus 40.

In FIG. 3, wireless communication between the base station apparatus 40 and the moving body 10 and the intra-group communication between the moving bodies 10 commonly use the same antenna, but they may use different antennas. For example, the wireless communication between the base station apparatus 40 and the moving body 10 and the intra-group communication between the moving bodies 10 may use different wireless systems (e.g., cellular system and wireless LAN) and use different antennas.

According to the embodiment, the base station 46 is capable of communicating with the first mobile station 20d and the second mobile station 20a in a first communication mode or a second communication mode. The base station 46 communicates with the first mobile station 20d and the second mobile station 20a without a direct communication between the first mobile station 20a and the second mobile station 20a in the first communication mode. The base station 46 communicates with at least one of the first mobile station 20d or the second mobile station 20a via the direct communication between the first mobile station 20d and the second mobile station 20a in the second communication mode. The movement management server 30 is configured to determine a state of a first wireless link between the first mobile station 20d and the base station 46 and a state of a second wireless link between the second mobile station 20a and the base station 46 in the first communication mode. The movement management server 30 is configured to transmit a control signal to the first mobile station 20d and the second mobile station 20a in accordance with the state of the first wireless link and the state of the second wireless link. The control signal includes a signal for changing the first communication mode to the second communication mode.

Quality Deterioration Detection

Next, a quality deterioration detection function of the quality monitoring unit 34 will be described.

Based on the measurement, result of the connection quality of the wireless link sent from the wireless device 44, the quality monitoring unit 34 detects the first moving body whose movement control quality has been deteriorated due to deterioration of the connection quality of the wireless link with the base station apparatus 40, similarly to step S102 of FIG. 4.

Similarly to step S104 of FIG. 4, the quality monitoring unit 34 determines the second moving body that is one of the moving bodies within the communication range of the first moving body whose movement control quality has been deteriorated and is predicted to be able to continue to communicate with the base station apparatus 40. Furthermore, the quality monitoring unit 34 groups the first and second moving bodies. The second moving body is set as the server and the first moving body is set as the client for the intra-group communication.

Similarly to step S106 of FIG. 4, the quality monitoring unit 34 transmits the identification information of the first and second moving bodies to the link control unit 48.

Similarly to step S108 of FIG. 4, the link control unit 48 transmits a grouping signal to the base station 46. The grouping signal instructs grouping the first and second moving bodies and switching the wireless link between the base station apparatus 40 and the first moving body to the bypass wireless link. The bypass wireless link includes the wireless link between the base station apparatus 40 and the second moving body and the intra-group wireless link between the second and first moving bodies.

Similarly to step S112 of FIG. 4, the base station 46 transmits the grouping signals to the first and second moving bodies.

Similarly to step S314 of FIG. 4, upon receiving the grouping signal, the first moving body disconnects the wireless link with the base station apparatus 40 and connects the wireless link for intra-group communication. In the intra-group communication, the second moving body is the server and the first moving body is the client. This enables the intra-group communication between the second and first moving bodies.

The communication mode of the first moving body whose movement control quality is detected to have been deteriorated is switched from the first communication mode to the second communication mode. Therefore, the first moving body receives the control signal via the second moving body, and hence the movement control quality is not deteriorated.

Note that as described above, in a case where it is predicted that the connection quality of the wireless link between the certain moving body 10 and the base station 46 is deteriorated and the movement control quality of the certain moving body 10, e.g., the moving bodies 10a and 10c, is deteriorated, or in a case where it is detected that the movement control quality of the certain moving bodies 10a and 10c is deteriorated, the communication mode of the moving bodies 10a and 10c to be grouped is changed from the first communication mode to the second communication mode. Due to the grouping, the main portion of the movement control of the moving bodies 10a and 10c is passed from the base station apparatus 40 to the moving body 10d, which is the server for the intra-group communication. The movement control function by the controller 14 of the moving body 10 may be lower than the movement control function by the movement management unit 32 of the movement management server 30. Therefore, in a case where the connection quality of the wireless link between the moving bodies 10a and 10c and the base station apparatus 40 is improved and it is predicted that the movement control quality of the moving bodies 10a and 10c will be improved, or in a case where it is detected that the movement control quality of the moving bodies 10a and 10c is improved, the main portion of the movement control of the moving bodies 10a and 10c may be returned from the moving body 10d to the base station apparatus 40.

Therefore, the quality monitoring unit 34 may include a function of performing analysis processing such as machine learning. The machine learning receives the state of the wireless link between the base station apparatus 40 and the moving body 10 and the control signal as inputs. Using the machine learning, the quality monitoring unit 34 determines the first moving body for which future improvement of the movement control quality is predicted by improving the connection quality of the wireless link to the base station apparatus 40 and the improvement prediction time. Furthermore, the quality monitoring unit 34 may include a function of detecting an improvement in movement control quality due to the improvement of the connection quality of the wireless link between the base station apparatus 40, based on the state of the wireless link between the base station apparatus 40 and the moving body 10.

Quality Improvement Prediction Function

A quality improvement prediction function of the quality monitoring unit 34 will be described.

Figure 5:
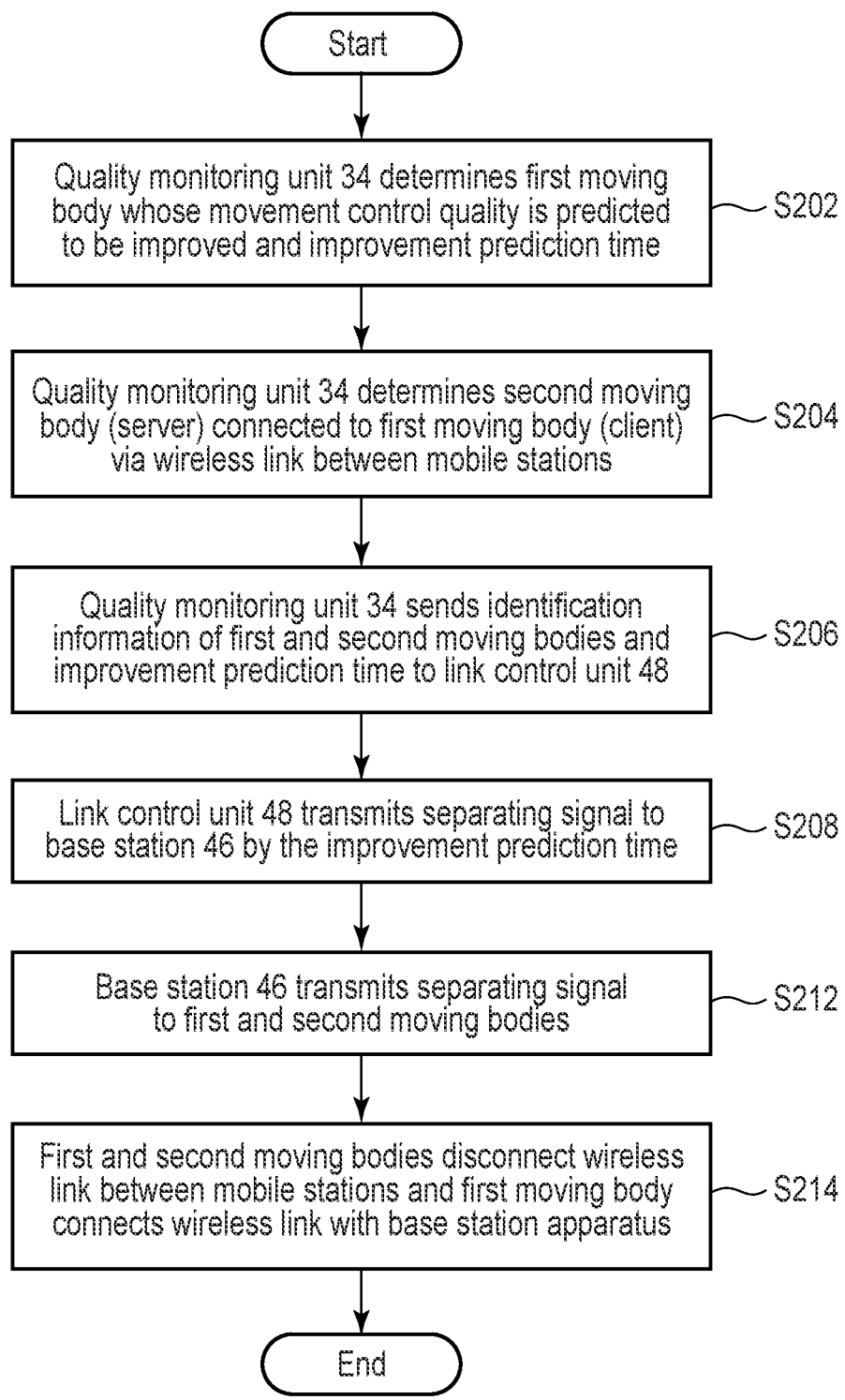
FIG. 5 is a flowchart showing an example of the operation of the movement management system.

Assuming that at present, as shown in FIG. 3, the connection quality of the wireless link between the three moving bodies 10b, 10d, and 10e and the base station apparatus 40, i.e., the movement control quality of the moving bodies 10b, 10d, and 10e is good, but the connection quality of the wireless link between the two moving bodies 10a and 10c and the base station apparatus 40, i.e., the movement control quality of the moving bodies 10a and 10c, has been deteriorated. FIG. 5 shows an example of the operation of the movement management system in a case where in the future, the movement control quality of the two moving bodies 10a and 10c is predicted to be improved, and as shown in FIG. 1, the connection quality of the wireless link between the two moving bodies 10a and 10c and the base station apparatus 40 is improved.

The quality monitoring unit 34 determines the first moving body (here, the moving bodies 10a and 10c) whose movement control quality is predicted to be improved due to the improvement of the connection quality of the wireless link with the base station apparatus 40, and improvement prediction times tb1 and tb2 of the first moving bodies 10a and 10c, respectively (step S202 of FIG. 5). The times tb1 and tb2 may be the same, but they are different here.

Furthermore, the quality monitoring unit 34 determines the second moving body (here, the moving body 10d) performing the intra-group communication with the first moving body 10a and the second moving body (here, the moving body 10d) performing the intra-group communication with the first moving body 10c (step S204 of FIG. 5). The second moving bodies performing the intra-group communication with the first moving bodies 10a and 10c may be different from each other, but a single second moving body may perform the intra-group communication with the first moving bodies 10a and 10c.

The quality monitoring unit 34 transmits identification information of the first moving bodies 10a and 10c, the improvement prediction times tb1 and tb2, and identification information of the second moving body 10d to the link control unit 43 (step S206 of FIG. 5).

The link control unit 48 transmits, to the base station 46 by the improvement prediction time tb1, a first separating signal. The first separating signal instructs separating the group of the first and second moving bodies 10a and 10d and switching the bypass wireless link to the wireless link between the base station apparatus 40 and the first moving body 10a (step S208 of FIG. 5). The bypass wireless link includes the wireless link between the base station apparatus 40 and the second moving body 10d and the intra-group wireless link between the second and first moving bodies 10d and 10a.

Similarly, the link control unit 48 transmits, to the base station 46 by the improvement prediction time tb2, a second separating signal. The second separating signal instructs separating the group of the first and second moving bodies 10c and 10d and switching the bypass wireless link to the wireless link between the base station apparatus 40 and the first moving body 10c (step S208 of FIG. 5). The bypass wireless link includes the wireless link between the base station apparatus 40 and the second moving body 10d and the intra-group wireless link between the second and first moving bodies 10d and 10c.

The separating signal instructs to change the communication mode of each moving body 10 from the second communication mode to the first communication mode. That is, the separating signal instructs switching from the second communication mode in which the plurality of moving bodies 10 performs the intra-group communication and one moving body 10 in the group is connected to the base station apparatus 40 to the first communication mode in which each moving body 10 is independently connected to the base station apparatus 40.

The first separating signal may include the improvement prediction time tb1. The second separating signal may include the improvement prediction time tb2.

The base station 46 transmits the first separating signals to the first and second moving bodies 10a and 10d, and transmits the second separating signals to the first and second moving bodies 10c and 10d (step S212 of FIG. 5).

Upon receiving the first separating signal, the controller 14a of the first moving body 10a disconnects the wireless link for the intra-group communication with the second moving body 10d and connects the wireless link with the base station apparatus 40. Upon receiving the first separating signal, the controller 14d of the second moving body 10d maintains the wireless link with the base station apparatus 40 and disconnects the wireless link for the intra-group communication with the first moving body 10a (step S214 in FIG. 5).

Similarly, upon receiving the second separating signal, the controller 14c of the first moving body 10c disconnects the wireless link for the intra-group communication with the second moving body 10d and connects the wireless link with the base station apparatus 40. Upon receiving the second separating signal, the controller 14d of the second moving body 10a maintains the wireless link with the base station apparatus 40 and disconnects the wireless link for the intra-group communication with the first moving body 10c (step S214 in FIG. 5). The timing at which the link control unit 48 transmits the first and second separating signals to the base station 46 in step S208 is set, in consideration of the time required for switching the link. The timing is set such that the time at which communication between the first moving body and the base station 46 is enabled (step S214) becomes earlier than the improvement prediction time.

Thus, when the client moving bodies 10a and 10c perform the intra-group communication, the movement of the client moving bodies 10a and 10c are controlled by the server moving body 10d, and it is predicted that the movement control quality of the clients 10a and 10c is improved, the main portion of the movement control of the client 10a and 10c is returned from the server 10d to the base station apparatus 40.

Quality Improvement, Detection Function

A quality improvement detection function of the quality monitoring unit 34 will be described.

Based on the measurement result of the connection quality of the wireless link sent from the wireless device 44, the quality monitoring unit 34 detects the first moving body whose movement control quality is improved due to the improvement of the connection quality of the wireless link with the base station apparatus 40, similarly to step S202 of FIG. 5.

Similarly to step S204 of FIG. 5, the quality monitoring unit 34 detects the second moving body performing the intra-group communication with the first moving body whose movement control quality is improved.

Similarly to step S206 of FIG. 5, the quality monitoring unit 34 transmits the identification information of the first and second moving bodies to the link control unit 43.

Similarly to step S208 of FIG. 5, the link control unit 43 transmits, to the base station 46, a separating signal. The separating signal instructs separating the group of the first and second moving bodies and switching the bypass wireless link to the wireless link between the base station apparatus 40 and the first moving body. The bypass wireless link includes the wireless link between the base station apparatus 40 and the second moving body and the intra-group wireless link between the second and first moving bodies.

Similarly to step S212 of FIG. 5, the base station 46 transmits the separating signals to the first and second moving bodies.

Similarly to step S214 of FIG. 5, upon receiving the separating signal, the first moving body disconnects the wireless link for the intra-group communication with the second moving body and connects the wireless link with the base station apparatus 40. Thus, the first moving body is switched from the intra-group communication to the communication with the base station apparatus 40 and directly receives the control signal from the base station apparatus 40.

Communication Procedure

FIG. 6 shows an example of a communication procedure when performing the intra-group communication after generation of the grouping signal. FIG. 6 shows an example of a communication procedure when a state of communicating with the base station apparatus 40 as shown in FIG. 1 is switched to a state of performing the intra-group communication in a group including the one second moving body 10d serving as the server and the two first moving bodies 10a and 10c serving as clients as shown in FIG. 3.

As shown in step S103 of FIG. 4, the quality monitoring unit 34 of the movement management server 30 transmits the grouping signal to the link control unit 48 of the base station apparatus 40 (S702).

As shown in step S112 of FIG. 4, the base station apparatus 40 transmits the first grouping signals to the moving body 10d and the moving body 10a, and transmits the second grouping signals to the moving body 10d and the moving body 10c (S704).

Upon receiving the first grouping signal, the controller 14d of the moving body 10d starts a corresponding process and executes processing as the server of the intra-group communication with the moving body 10a. Upon receiving the first grouping signal, the controller 14a of the moving body 10a starts a corresponding process and executes processing as the client of the intra-group communication with the moving body 10d.

Upon receiving the second grouping signal, the controller 14d of the moving body 10d starts a corresponding process and executes processing as the server of the intra-group communication with the moving body 10c. Upon receiving the second grouping signal, the controller 14a of the moving body 10c starts a corresponding process and executes processing as the client of the intra-group communication with the moving body 10d.

After confirming that the controller 14d of the moving body 10d and the controllers 14a and 14c of the moving bodies 10a and 10c can communicate with each other, the controller 14d of the moving body 10a and the controllers 14a and 14c of the moving bodies 10a and 10c, based on the first and second grouping signals from the base station apparatus 40, connect the intra-group wireless link between the moving body 10d and the moving bodies 10a and 10c to start the intra-group communication (S706).

The wireless link between mobile stations can be realized by, for example, issuing, by using a wireless signal to a communication destination moving body from the moving body 10d or the moving bodies 10a and 10c, a connection request signal. The connection request signal includes information such as an identifier of a communication destination moving body, an identifier of a communication originating moving body, and a group identifier included in a grouping signal.

The identifier of the moving body refers to the identifier included in the grouping signal from the base station apparatus 40 and a relating signal, and may be a temporary ID issued from the base station apparatus 40, a logical address of the apparatus, or the like.

The movement management unit 32 of the movement management server 30 transmits a control signal of a server to the base station 46 (S708).

The base station apparatus 40 transmits the control signal of the server to the moving body 10d (S712).

Upon receiving the control signal of the server from the base station apparatus 40, the controller 14 of the moving body 10d controls its own movement (S714).

The controller 14 of the moving body 10d generates a control signal of a client based on the received control signal (S716). If the movement control policy for the moving bodies 10a and 10c is indicated in the grouping signal, the controller 14d of the moving body 10d can generate the control signal of the client from the control signal of the server in accordance with the embedded application. For example, in a case where the policy of "keeping the distances between the moving body 10d and the moving bodies 10a and 10c constant" is indicated, the controller 14d of the moving body 10d detects the distances between the moving body 10d and the moving bodies 10a and 10c while controlling its own movement, and generates the control signals of the client to control the moving bodies 10a and 10c so that the detected distances become constant, respectively.

In order to generate the control signals of the client, the controller 14d of the moving body 10d may receive monitoring signals respectively from the moving bodies 10a and 10c. The controller 14d of the moving body 10a may monitor the quality of the wireless link between mobile stations of the moving bodies 10a and 10d and the quality of the wireless link between mobile stations of the moving bodies 10c and 10d instead of receiving the monitoring signals from the moving bodies 10a and 10c. The wireless link between mobile stations of the moving bodies 10a and 10d corresponds to the distance between the moving bodies 10a and 10d, and the wireless link between mobile stations of the moving bodies 10c and 10d corresponds to the distance between the moving bodies 10c and 10d. Methods of monitoring the quality of the wireless link include measurement of the received power or error rate of the wireless link or RTT measurement by transmission and reception of alive monitoring packets.

The controller 14d of the moving body 10d transmits the generated control signals of the client to the moving bodies 10a and 10c (S713).

The controllers 14a and 14c of the moving bodies 10a and 10c control their own speed, direction, and the like in accordance with the received control signals (S722).

The controllers 14a and 14c of the moving bodies 10a and 10c include the distance information with the moving body 10d updated as a result thereof into the monitoring signals and send them to the moving body 10d (S724).

While controlling its own movement based on the speed and direction which are included in the control signal from the movement management server 30, the controller 14d of the moving body 10d continues communication with the base station apparatus 40 for executing an application in each of the moving body 10d, the base station apparatus 40, and the movement management server 30.

As a result of the movement control, the controller 14d of the moving body 10d transmits a monitoring signal including the speed and direction of an actual movement to the base station apparatus 40 (S728), and the base station apparatus 40 transmits the received monitoring signal to the movement management server 30 (S732). The controller 14d of the moving body 10d may include the positions and speed information of the moving bodies 10a and 10c received from the moving bodies 10a and 10c or the relative positions, relative distances, and the like of the moving bodies 10a and 10c with respect to the moving body 10d into the monitoring signals, and transmit them to the base station apparatus 40.

As another example of the monitoring signal that the moving body 10d transmits to the base station apparatus 40 in S728, the controller 14d of the moving body 10d may convert the monitoring signals of the moving bodies 10a and 10c transmitted from the moving bodies 10a and 10c into signals in a format suitable for the movement management server 30, include the converted signals into its own movement monitoring control signal, and transmit it. For example, the controller 14d of the moving body 10d may recalculate the relative position information of the moving bodies 10a and 10c with respect to the moving body 10d as absolute position information with reference to the position information of the moving body 10d. This recalculation processing can also be performed by the movement management server 30. However, when the moving body 10d serving as the server for the intra-group communication performs the recalculation processing, the moving body 10d performs part of the recalculation processing of the movement management server 30, which is effective in reducing the processing load of the movement management server 30.

The communication procedure of the moving body 10d and the moving bodies 10a and 10c at the time of the intra-group communication may be changed to another simpler procedure. The controller 14d of the moving body 10d may transmit a synchronization signal, such as a preamble and a beacon to the moving bodies 10a and 10c instead of the control information including the speeds and directions of the moving bodies 10a and 10c. The controllers 14a and 14c of the moving bodies 10a and 10c control their own movement so as to be capable of receiving the preamble or the beacon in a constant power and a constant direction from the moving body 10d. At this time, the controllers 14a and 14c of the moving bodies 10a and 10c may detect the reception power and direction of the preamble or the beacon, and transmit the detection result to the moving body 10d.

If the reception power and direction of the preamble or the beacon transmitted from the moving bodies 10a and 10c are within a predetermined range, the controller 14d of the moving body 10d judges that the intra-group communication link is normal and continues the intra-group communication link. On the other hand, if the reception power and direction of the preamble or the beacon transmitted from the moving bodies 10a and 10c are out of the predetermined range, the controller 14d of the moving body 10d may determine that the intra-group communication link is abnormal, and stop the operation in accordance with the application of the controller 14d.

While communicating with the moving body 10d, the moving bodies 10a and 10c as the client stop executing the respective applications of the moving bodies 10a and 10c, the base station apparatus 40, and the movement management server 30, and release the wireless link with the base station apparatus 40. If the base station apparatus 40 conforms to the cellular system, the moving bodies 10a and 10c become an idle state as a result, and it is possible to reduce the battery consumption of the moving bodies 10a and 10c.

As described above, the quality monitoring unit 34 of the movement management server 30 can detect or predict that the connection quality of the wireless link between the base station apparatus 40 and the moving body 10 is deteriorated, the moving body 10 cannot receive the control signal from the movement management server 30, and the movement of the moving body 10 has become unstable or will become unstable. In a case where the movement control quality of the moving body 10 has been deteriorated or in a case where the movement control quality of the moving body 10 is predicted to be deteriorated, the quality monitoring unit 34 switches the wireless link between the moving body 10 whose movement control quality has been deteriorated or is predicted to be deteriorated and the base station apparatus 40 to the bypass wireless link. The bypass wireless link includes the wireless link between the base station apparatus 40 and another moving body 10 and the intra-group wireless link between the moving body 10 whose movement control quality has been deteriorated or is predicted to be deteriorated and the other moving body 10. Thus, the moving body 10 whose movement control quality has been deteriorated or is predicted to be deteriorated can receive the control signal from the movement management server 30 and the base station apparatus 40 via the other moving body 10, and can prevent the movement control quality from being deteriorated.

Second Communication Procedure

FIG. 7 shows an example of a communication procedure when the communication state between mobile stations shown in FIG. 3 is switched to the communication state with the base station apparatus 40 shown in FIG. 1.

The controller 14d of the moving body 10d serving as the server performs the intra-group communication with the moving bodies 10a and 10c serving as clients (S802) and performs communication with the movement management server 30 via the base station apparatus 40 (S804). While communicating with the moving bodies 10a and 10c, the controller 14d of the moving body 10d continuously transmits the monitoring signal of the moving body 10d to the movement management server 30.

The movement management unit 32 of the movement management server 30 transmits a control signal including the speed and direction of the moving body 10d to the base station apparatus 40 (S806).

The base station apparatus 40 transmits the control signal to the moving body 10d (S808).

The controller 14d of the moving body 10d controls its own movement based on the speed and direction which are included in the control signal from the movement management server 30 (S812).

The controller 14d of the moving body 10d controls the movement of the moving bodies 10a and 10c in accordance with the procedure of S716, S718, S722, and S724 in FIG. 6.

The controller 14d of the moving body 10d transmits the monitoring signal of the moving bodies 10a and 10c and its own monitoring signal to the base station apparatus 40 (S822). The monitoring signal is transmitted with being included in the payload of the wireless frame.

The wireless device 44 of the base station apparatus 40 transmits the monitoring signal to the movement management unit 32 of the movement management server 30 (S324).

The movement management unit 32 estimates the movement of the moving bodies 10a and 10c by using the monitoring signal transmitted from the wireless device 44 (S826).

The movement management unit 32 generates a control signal of the moving foody 10d based on the monitoring signal. The movement management unit 32 performs analysis processing such as machine learning. The machine learning receives the generated control signal of the moving body 10d and the estimated moving state of the moving bodies 10a and 10c as inputs. Using the machine learning, the movement management unit 32 predicts improvement of the connection quality of the wireless link between the moving body 10a and/or the moving body 10c and the base station apparatus 40 (S828). Assuming that an improvement in the connection quality of the wireless link between the moving body 10a and the base station apparatus 40 has been predicted.

The quality monitoring unit 34 transmits the identification information of the moving body 10a whose quality improvement is predicted and the improvement prediction time to the link control unit 48.

The link control unit 48 determines the moving body 10d serving as the server of the intra-group communication with the moving body 10a. The link control unit 43 transmits, to the base station 46, a separating signal including the identification information of the moving bodies 10a and 10d by the improvement prediction time. The link control unit 48 may include the improvement prediction time into the separating signal.

The base station 46 transmits a signal including an instruction to stop the intra-group communication with the moving body 10a to the moving body 10d. Upon receiving this instruction signal, the controller 14d of the moving body 10d ends the processing as the server of the intra-group communication if the client of the intra-group communication is only the moving body 10a. If the client of the intra-group communication other than the moving body 10a exists, the controller 14d of the moving body 10d stops the function as the server for the moving body 10a, and continues the processing as the server of the intra-group communication with the other clients.

The base station apparatus 40 transmits a signal including an instruction to stop the intra-group communication with the moving body 10d to the moving body 10a. If the communication between the base station apparatus 40 and the moving body 10 conforms to the cellular system, this signal may be a paging signal for the moving body 10a. The moving body 10a having been in the idle state reconnects the wireless link with the base station apparatus 40 by receiving the paging signal. The controller 14a of the moving body 10a ends the corresponding process, thereby ending the processing as the client of the intra-group communication. When connecting the wireless link with the base station apparatus 40, the controller 14a of the moving body 10a resumes the execution of the applications of the moving body 10a and the movement management server 30.

Thereafter, the movement management server 30 transmits a control signal including the speed and direction of the moving body to the moving body 10a. The controller 14a of the moving body 10a controls its own movement based on the speed and direction which are included in the movement management server 30. As a result of the control, the controller 14a of the moving body 10a transmits a monitoring signal including the actual moving speed and direction to the movement management server 30.

A similar operation to that described above is executed in S828 if improvement of the connection quality of the wireless link between the moving body 10c and the base station apparatus 40 is predicted.

As described above, according to the communication procedure shown in FIG. 7, in a case where the moving bodies 10a, 10c, and 10d perform the intra-group communication, the moving bodies 10a and 10c are the clients, the moving body 10d is the server, the movements of the moving bodies 10a and 10c are not directly controlled by the movement management server 30 and indirectly controlled by the movement management server 30 via the moving body 10d, and it is predicted that the connection quality of the wireless link between the moving bodies 10a and 10c and the base station apparatus 40 is improved, the intra-group wireless link between mobile stations of the client moving bodies 10a and 10c is switched to the wireless link with the base station apparatus 40 by an instruction from the base station apparatus 40. Thus, the movement controls of the client moving bodies 10a and 10c are performed by direct instructions from the movement management server 30. Therefore, even in a usage environment where large cargo is frequently operated and the wireless communication environment changes in response to a change in a production line or the like such as in a factory or a warehouse, it is possible to automatically and quickly resume the connection with the base station and to achieve high-quality movement control.

Third Communication Procedure

FIG. 8 shows an example of the communication procedure of the base station apparatus 40 when the wireless link between the base station apparatus 40 and a moving body is switched to the wireless link between the base station apparatus 40 and another moving body.

Assume that the three moving bodies 10a, 10c, and 10d are directly connected to the movement management server 30 via the base station apparatus 40 as shown in FIG. 1.

The movement management server 30 uses the wireless links between the base station apparatus 40 and the moving bodies 10a, 10c, and 10d, respectively, to execute movement control of the three moving bodies 10a, 10c, and 10d (S302). The operation at S302 corresponds to the operations at S708, S712, S714, S728, and S732 in FIG. 6.

The movement management server 30 performs analysis processing such as machine learning. The machine learning receives the state of the wireless links between the moving bodies 10a, 10c, and 10d and the base station apparatus 40 and the control signals of the moving bodies 10a, 10c, and 10d as inputs. Using the machine learning, the movement management server 30 predicts deterioration in the connection quality of the wireless links between the moving bodies 10a, 10c, and 10d and the base station apparatus 40, i.e., deterioration in the quality of the movement control of the moving bodies 10a, 10c, and 10d (S312). Assume that the quality of the movement control of the moving bodies 10a and 10c has been deteriorated.

The movement management server 30 performs analysis processing such as the machine learning. Using the machine learning, the movement management server 30 determines the first moving body and the second moving body. The first moving body includes the moving bodies 10a and 10c whose movement control quality is predicted to be deteriorated. The second moving body includes the moving body 10d that is within the communication range of the first moving bodies 10a and 10c, has a good connection quality of the wireless link with the base station apparatus 40, and is predicted that the movement control quality is maintained. In order to group the first and second moving bodies 10a, 10c, and 10d, and manage the movement management of the moving bodies 10a, 10c, and 10d in the group with a group mode by using the intra-group communication, the movement management server 30 transmits a grouping signal to the base station apparatus 40 (S314). The grouping signal includes identification information of the target moving bodies and instructs link switching and grouping start.

In order to confirm the state of the intra-group wireless link between the target moving bodies 10, the base station apparatus 40 transmits grouping standby signals to the moving bodies 10a, 10c, and 10d (S316). The grouping standby signal includes information of the moving bodies 10d serving as the server and the moving bodies 10a and 10c serving as clients of the intra-group communication.

Upon receiving the grouping standby signals, the controllers 14a, 14c, and 14d of the moving bodies 10a, 10c, and 10d search the other two moving bodies 10 in order to judge whether or not the communication service between the server mobile station (moving body 10a) and the client mobile station (moving bodies 10a and 10c) is possible (S318). Specifically, the respective controllers 14a, 14c, and 14d of the moving bodies 10a, 10c, and 10d measure the connection qualities of the wireless links with the other two moving bodies 10, and determine whether or not the intra-group communication is possible.

If the controller 14a, 14c, or 14d of the moving body 10a, 10c, or determines that the intra-group communication is possible, the controller 14a, 14c, or 14d transmits a grouping ready signal to the base station apparatus 40 (S322). The grouping ready signal includes the availability of the communication service between the mobile stations.

The base station apparatus 40 transmits a grouping signal to the moving body 10a, 10c, or 10d determined to be capable of the communication service between the moving bodies (S324).

The movement management server 30 stops the movement control of the moving bodies 10a and 10c that are capable of being grouped and serving as the clients. The mobile stations 20a and 20c of the moving bodies 10a and 10c transition to the idle state (S326). The moving body 10d serving as the server maintains the wireless link with the base station apparatus 40 and continues communication with the movement management server 30.

The base station apparatus 40 transmits a grouping completion signal to the movement management server 30 (S328). The grouping completion signal includes the identification information of the moving bodies 10a, 10c, and 10d capable of being grouped.

Upon receiving the grouping signals, the controllers 14a, 14c, and 14d of the moving bodies 10a, 10c, and 10d connect the intra-group wireless links and perform predetermined communication (S332). Specifically, the controller 14d of the moving body 10d transmits predetermined wireless link connection request signals to the moving bodies 10a and 10c. The wireless link connection request signal includes information of wireless resources such as frequency, bandwidth, and communication method that are necessary for wireless connection. The controllers 14a and 14c of the moving bodies 10a and 10c acquire the wireless resources requested by the request signal and notify the moving body 10d of the connection of the wireless link. The operation at S332 corresponds to the operations at S706, S708, S712, S714, S716, S718, S722, S724, S728, and S732 in FIG. 6.

Of the link switching procedure of the base station apparatus 40 shown in FIG. 8, the transmission of the grouping standby signal (S316), the transmission of the grouping ready signal (S322), and the transmission of the grouping signal (S324) can be implemented as communication applications of the base station apparatus 40 and the moving body 10.

Fourth Communication Procedure

FIG. 9 shows an example of the communication procedure of the base station apparatus 40 when the intra-group wireless link is switched to the wireless link between the moving body and the base station apparatus 40.

Assume, as shown in FIG. 3, that the server moving body 10d is directly connected to the movement management server 30 via the base station apparatus 40, and the client moving bodies 10a and 10c perform the intra-group communication and are indirectly connected to the movement management server 30 via the server moving body 10d.

The mobile stations 20a and 20c of the moving bodies 10a and 10c are in the idle state (S402).

The controllers 14a, 14c, and 14d of the moving bodies 10a, 10c, and 10d respectively connect the intra-group wireless links and perform predetermined communication (S404). Specifically, the controller 14*d* of the moving body 10*d* transmits predetermined wireless link connection request signals to the moving bodies 10*a* and 10*c*. The wireless link connection request signal includes information of wireless resources such as frequency, bandwidth, and communication method that are necessary for wireless connection. Using the wireless resources requested by the request signals, the controllers 14*a* and 14*c* of the moving bodies 10*a* and 10*c* execute connection of the wireless links to the moving body 10*d*. The operation at S404 corresponds to the operations at S706, S703, S712, S714, S716, S713, S722, S724, S728, and S732 in FIG. 6.

The movement management server 30 performs analysis processing such as machine learning. The machine learning receives the state of the wireless links between the moving bodies 10*a*, 10*c*, and 10*d* and the base station apparatus 40 and the control signals of the moving bodies 10*a*, 10*c*, and 10*d*, as inputs. Using the machine learning, the movement management server 30 predicts improvement of the movement control quality of the client moving bodies 10*a* and 10*c* (S412). Assume here that an improvement in the movement control quality of the moving body 10*c* is predicted, and that an improvement in the movement control quality of the moving body 10*a* is not predicted.

The movement management server 30 determines a moving body (the moving body 10*c*) whose movement control quality is predicted to be improved, and a moving body (the moving body 10*d*) to be the server of the intra-group communication with the moving body 10*c*. In order to separate the group of the moving bodies 10*c* and 10*d*, the movement management server 30 transmits a separating signal to the base station apparatus 40 (S414). The separating signal includes the identification information of the target moving bodies 10*c* and 10*a*.

The base station apparatus 40 transmits a paging signal to the client moving body 10*c* (S416).

Upon receiving the paging signal, the moving body 10*c* executes a predetermined connection request signal procedure, thereby establishing the wireless link with the base station apparatus 40 and transitioning to the connection state (S422).

After confirming the transition of the client moving body 10*c* to the connection state, the base station apparatus 40 transmits a separating signal to the server moving body 10*d*. The separating signal includes the identification information of the client moving body 10*c* which is separated from the group (S424). The base station apparatus 40 transmits a separation completion signal to the movement management server 30. The separation completion signal includes the identification information of the moving body 10*c* which is separated from the group (S426).

The movement management server 30 starts a movement management service of the moving body 10*c* (S432). If there is a moving body (here, the moving body 10*a*) which is still in the group, the movement management server 30 continues the communication service with the moving body 10*a* via the moving body 10*d* (S434).

Of the link switching procedure of the base station apparatus 40 shown in FIG. 9, the transmission of the separating signal (S424) can be implemented as a communication application of the base station apparatus 40 and the moving body 10.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fail within the scope and spirit of the inventions.

What is claimed is:

1. A wireless apparatus comprising: wireless circuitry capable of communicating with a first mobile station and a second mobile station in a first communication mode or a second communication mode, wherein the wireless circuitry communicates with the first mobile station and the second mobile station without a direct communication between the first mobile station and the second mobile station in the first communication mode, and the wireless circuitry communicates with at least one of the first mobile station or the second mobile station via the direct communication between the first mobile station and the second mobile station in the second communication mode; and a controller configured to: determine a state of a first wireless link between the first mobile station and the wireless circuitry and a state of a second wireless link between the second mobile station and the wireless circuitry in the first communication mode, and transmit a first signal to the first mobile station and the second mobile station by the wireless circuitry in accordance with the state of the first wireless link and the state of the second wireless link, wherein: the first signal includes a signal for changing the first communication mode to the second communication mode, the wireless circuitry is configured to transmit a control signal in the first communication mode or the second communication mode, the control signal includes a signal for controlling movement of the first mobile station and movement of the second mobile station, and in a case where deterioration in a movement control quality of the first mobile station is predicted when the control signal is transmitted from the wireless circuitry to the first mobile station in the first communication mode, the first signal includes an instruction for disconnecting the first wireless link, connecting a third wireless link between the first mobile station and the second mobile station, and maintaining the second wireless link.

2. The wireless apparatus of claim 1, wherein the controller is configured to:
   determine a time at which deterioration of the movement control quality of the first mobile station is predicted, and transmit the first signal to the first mobile station and the second mobile station by the wireless circuitry by the time.

3. The wireless apparatus of claim 1, wherein the controller is configured to:
   transmit, to the first mobile station and the second mobile station, an inquiry as to whether communication by the third wireless link is possible, receive a response from the first mobile station and the second mobile station, the response indicating whether or not the communication by the third wireless link is possible, and transmit the first signal to the first mobile station and the second mobile station by the wireless circuitry in a case where the response indicates that the communication by the third wireless link is possible.

4. The wireless apparatus of claim 1, wherein: in a case where improvement in the movement control quality of the first mobile station is predicted when the control signal is transmitted from the wireless circuitry to the first mobile station in the second communication mode, the controller is configured to transmit, to the first mobile station and the second mobile station, a second signal for changing the second communication mode to the first communication mode, and the second signal includes an instruction for connecting the first wireless link, disconnecting the third wireless link, and maintaining the second wireless link.

5. The wireless apparatus of claim 4, wherein the controller is configured to:
determine a time at which improvement of the movement control quality of the first mobile station is predicted, and transmit the second signal to the first mobile station and the second mobile station by the wireless circuitry by the time.

6. The wireless apparatus of claim 4, wherein the controller is configured to transmit, to the first mobile station and the second mobile station by the wireless circuitry, a paging signal including the second signal.

7. A communication method of a wireless circuitry capable of communicating with a first mobile station and a second mobile station in a first communication mode or a second communication mode, wherein the wireless circuitry communicates with the first mobile station and the second mobile station without a direct communication between the first mobile station and the second mobile station in the first communication mode, and the wireless circuitry communicates with at least one of the first mobile station or the second mobile station via the direct communication between the first mobile station and the second mobile station in the second communication mode, the method comprising:
determining a state of a first wireless link between the first mobile station and the wireless circuitry and a state of a second wireless link between the second mobile station and the wireless circuitry in the first communication mode; transmitting a first signal to the first mobile station and the second mobile station by the wireless circuitry in accordance with the state of the first wireless link and the state of the second wireless link, wherein the first signal includes a signal for changing the first communication mode to the second communication mode; and transmitting a control signal in the first communication mode or the second communication mode;
wherein: the control signal includes a signal for controlling movement of the first mobile station and movement of the second mobile station, and in response to predicting deterioration in a movement control quality of the first mobile station when the control signal is transmitted from the wireless circuitry to the first mobile station in the first communication mode, the first signal includes an instruction for disconnecting the first wireless link, connecting a third wireless link between the first mobile station and the second mobile station, and maintaining the second wireless link.

8. The communication method of claim 7, further comprising: determining a time at which deterioration of the movement control quality of the first mobile station is predicted; and
transmitting the first signal to the first mobile station and the second mobile station by the wireless circuitry by the time.

9. The communication method of claim 7, further comprising: transmitting, to the first mobile station and the second mobile station, an inquiry as to whether communication by the third wireless link is possible; receiving a response from the first mobile station and the second mobile station, the response indicating whether or not the communication by the third wireless link is possible; and
transmitting the first signal to the first mobile station and the second mobile station by the wireless circuitry in a case where the response indicates that the communication by the third wireless link is possible.

10. The communication method of claim 7, further comprising: in a case where improvement in the movement control quality of the first mobile station is predicted when the control signal is transmitted from the wireless circuitry to the first mobile station in the second communication mode, transmitting, to the first mobile station and the second mobile station, a second signal for changing the second communication mode to the first communication mode, wherein the second signal includes an instruction for connecting the first wireless link, disconnecting the third wireless link, and maintaining the second wireless link.

11. The communication method of claim 10, further comprising: determining a time at which improvement of the movement control quality of the first mobile station is predicted, and transmitting the second signal to the first mobile station and the second mobile station by the wireless circuitry by the time.

12. The communication method of claim 10, further comprising transmitting, to the first mobile station and the second mobile station by the wireless circuitry, a paging signal including the second signal.

13. A wireless apparatus comprising: wireless circuitry capable of communicating with a first mobile station and a second mobile station in a first communication mode or a second communication mode, wherein the wireless circuitry communicates with the first mobile station and the second mobile station without a direct communication between the first mobile station and the second mobile station in the first communication mode, and the wireless circuitry communicates with at least one of the first mobile station or the second mobile station via the direct communication between the first mobile station and the second mobile station in the second communication mode; and a controller configured to:
determine a state of a first wireless link between the first mobile station and the wireless circuitry and a state of a second wireless link between the second mobile station and the wireless circuitry in the first communication mode, and transmit a first signal to the first mobile station and the second mobile station by the wireless circuitry in accordance with the state of the first wireless link and the state of the second wireless link, wherein: the first signal includes a signal for changing the first communication mode to the second communication mode, the wireless circuitry is configured to transmit a control signal for controlling movement of the first mobile station and movement of the second mobile station in the first communication mode or the second communication mode, in a case where improvement in a movement control quality of the first mobile station is predicted when the control signal is transmitted from the wireless circuitry to the first mobile station in the second communication mode, the controller is configured to transmit, to the first mobile station and the second mobile station, a second signal for changing the second communication mode to the first communication mode, and the second signal includes an instruction for connecting the first wireless link, disconnecting a third wireless link between the first mobile station and the second mobile station, and maintaining the second wireless link.

14. The wireless apparatus of claim 13, wherein, in a case where deterioration in the movement control quality of the first mobile station is predicted when the control signal is transmitted from the wireless circuitry to the first mobile station in the first communication mode, the first signal includes an instruction for disconnecting the first wireless link, connecting the third wireless link, and maintaining the second wireless link.

15. The wireless apparatus of claim 14, wherein the controller is configured to:
determine a time at which deterioration of the movement control quality of the first mobile station is predicted, and transmit the first signal to the first mobile station and the second mobile station by the wireless circuitry by the time.

16. The wireless apparatus of claim 14, wherein the controller is configured to:
transmit, to the first mobile station and the second mobile station, an inquiry as to whether communication by the third wireless link is possible, receive a response from the first mobile station and the second mobile station, the response indicating whether or not the communication by the third wireless link is possible, and transmit the first signal to the first mobile station and the second mobile station by the wireless circuitry in a case where the response indicates that the communication by the third wireless link is possible.

17. The wireless apparatus of claim 13, wherein the controller is configured to:
determine a time at which improvement of the movement control quality of the first mobile station is predicted, and transmit the second signal to the first mobile station and the second mobile station by the wireless circuitry by the time.

18. The wireless apparatus of claim 13, wherein the controller is configured to transmit, to the first mobile station and the second mobile station by the wireless circuitry, a paging signal including the second signal.

19. A communication method of a wireless circuitry capable of communicating with a first mobile station and a second mobile station in a first communication mode or a second communication mode, wherein the wireless circuitry communicates with the first mobile station and the second mobile station without a direct communication between the first mobile station and the second mobile station in the first communication mode, and the wireless circuitry communicates with at least one of the first mobile station or the second mobile station via the direct communication between the first mobile station and the second mobile station in the second communication mode, the method comprising:
determining a state of a first wireless link between the first mobile station and the wireless circuitry and a state of a second wireless link between the second mobile station and the wireless circuitry in the first communication mode; transmitting a first signal to the first mobile station and the second mobile station by the wireless circuitry in accordance with the state of the first wireless link and the state of the second wireless link, wherein the first signal includes a signal for changing the first communication mode to the second communication mode; transmitting a control signal for controlling movement of the first mobile station and movement of the second mobile station in the first communication mode or the second communication mode; and in response to predicting improvement in a movement control quality of the first mobile station when the control signal is transmitted from the wireless circuitry to the first mobile station in the second communication mode, transmitting, to the first mobile station and the second mobile station, a second signal for changing the second communication mode to the first communication mode, wherein the second signal includes an instruction for connecting the first wireless link, disconnecting a third wireless link between the first mobile station and the second mobile station, and maintaining the second wireless link.

20. The communication method of claim 19, wherein, in a case where deterioration in the movement control quality of the first mobile station is predicted when the control signal is transmitted from the wireless circuitry to the first mobile station in the first communication mode, the first signal includes an instruction for disconnecting the first wireless link, connecting the third wireless link, and maintaining the second wireless link.

21. The communication method of claim 20, further comprising: determining a time at which deterioration of the movement control quality of the first mobile station is predicted, and transmitting the first signal to the first mobile station and the second mobile station by the wireless circuitry by the time.

22. The communication method of claim 20, further comprising: transmitting, to the first mobile station and the second mobile station, an inquiry as to whether communication by the third wireless link is possible, receiving a response from the first mobile station and the second mobile station, the response indicating whether or not the communication by the third wireless link is possible, and transmitting the first signal to the first mobile station and the second mobile station by the wireless circuitry in a case where the response indicates that the communication by the third wireless link is possible.

23. The communication method of claim 19, further comprising: determining a time at which improvement of the movement control quality of the first mobile station is predicted, and transmitting the second signal to the first mobile station and the second mobile station by the wireless circuitry by the time.

24. The communication method of claim 19, further comprising transmitting, to the first mobile station and the second mobile station by the wireless circuitry, a paging signal including the second signal.

* * * * *